United States Patent [19]

Mosley et al.

[11] Patent Number: 4,935,631

[45] Date of Patent: Jun. 19, 1990

[54] RADIATION METERS

[75] Inventors: Alan Mosley, Berkhamsted, England; Brian L. Kingston, Belfast,

[73] Assignee: The General Electric Company, p.l.c., England

[21] Appl. No.: 230,373

[22] PCT Filed: Dec. 8, 1987

[86] PCT No.: PCT/GB87/00889

§ 371 Date: Sep. 26, 1988

§ 102(e) Date: Sep. 26, 1988

[87] PCT Pub. No.: WO88/04414

PCT Pub. Date: Jun. 16, 1988

[30] Foreign Application Priority Data

Dec. 8, 1986 [GB] United Kingdom ............... 8629283

[51] Int. Cl.$^5$ .......................... G01J 5/06; G01T 1/16; G01T 1/20
[52] U.S. Cl. .............................. 250/458.1; 250/459.1; 250/461.1
[58] Field of Search ............... 250/461.1, 458.1, 459.1, 250/368, 372

[56] References Cited

U.S. PATENT DOCUMENTS

| | | | |
|---|---|---|---|
| 3,426,194 | 2/1969 | Donne | 250/461.1 |
| 3,912,931 | 10/1975 | Gravisse et al. | 250/458.1 |
| 4,149,902 | 4/1979 | Mauer et al. | 250/458.1 |
| 4,259,579 | 3/1981 | Geary | 250/368 |
| 4,262,206 | 4/1981 | Viehmann | 250/368 |
| 4,272,679 | 6/1981 | Blades | 250/372 |
| 4,292,959 | 10/1981 | Coburn, Jr. | 250/458.1 |
| 4,650,992 | 3/1987 | Ruhrman | 250/227 |
| 4,703,182 | 10/1987 | Kroneis | 250/461.1 |

FOREIGN PATENT DOCUMENTS

| | | |
|---|---|---|
| 0049048 | 4/1982 | European Pat. Off. |
| 0115025 | 12/1984 | European Pat. Off. |
| 522402 | 6/1940 | United Kingdom |
| 688672 | 3/1953 | United Kingdom |
| 766726 | 1/1957 | United Kingdom |
| 1429473 | 3/1976 | United Kingdom |
| 2089502 | 6/1982 | United Kingdom |

OTHER PUBLICATIONS

Goetzberger et al., "Solar Energy Conversion with Fluorescent Collectors", *Applied Physics*, vol. 14, No. 123, pp. 123-139 (1977).

Friedman, "Progress on the Development of Luminescent Solar Concentrators", *Spie*, vol. 248 (1980), pp. 98-104.

"The Sunburning Ultraviolet Meter: Design and Performance", by D. S. Berger, in Photochemistry and Photobiology, 1976, vol. 24, pp. 587-593.

"Luminescent Solar Concentrators. 1: Theory of Operation and Techniques for Performance Evaluation", by J. S. Batchelder et al., in Applied Optics, vol. 18, No. 18, Sep. 15, 1979.

*Primary Examiner*—Constantine Hannaher
*Assistant Examiner*—Edward J. Glick
*Attorney, Agent, or Firm*—Kirschstein, Ottinger, Israel & Schiffmiller

[57] ABSTRACT

A radiation meter for measuring the intensity of incident ultraviolet radiation in a predetermined wavelength band against a background of broadband radiation, such as sunlight, includes a sheet of a material incorporating a fluorescent dye. The dye is selected to absorb radiation in the predetermined wavelength band and consequently to emit fluorescent radiation. The fluorescent radiation is internally reflected within the sheet and emerges from an edge of the sheet, where it impinges on a photodiode. The photodiode produces an output which is dependent upon the intensity of the ultraviolet radiation. This output is used to drive a suitable display. The unwanted background radiation passes through the sheet without causing fluorescence of the dye, and is absorbed in an absorbent backing layer. The photodiode is so positioned and screened that the background radiation cannot impinge upon it. A particularly advantageous use of the meter is for measurement of the intensity of ultraviolet band radiation, which is the cause of sunburn and skin cancer.

14 Claims, 2 Drawing Sheets

RADIATION METERS

BACKGROUND OF THE INVENTION

1. Field of the Invention

This invention relates to radiation meters, and in particular to radiation meters for measuring the intensity of incident radiation within a predetermined wavelength band against a background of incident radiation within other wavelength bands, for example broadband radiation.

2. Description of Related Art

Such meters are widely used in a number of applications by individual consumers, in industry, and in medicine. One example is in the silicon integrated circuit industry where high-resolution photolithographic processes depend on a source of ultra-violet radiation of known intensity. In order to distinguish between the incident UV radiation and the background wideband radiation, the meters presently used in such an application employ a filter which selectively transmits UV radiation to a UV-sensitive photo-detector. As both these items are quite expensive, this leads to the cost of such a meter being relatively high.

SUMMARY OF THE INVENTION

It is an object of the present invention to provide such a radiation meter which does not necessarily require a filter for selectively transmitting radiation within a predetermined wavelength band nor a detector which is sensitive to radiation within the predetermined wavelength band, the meter thus being of lower cost than previously known meters of this type.

According to the present invention there is provided a radiation meter for measuring the intensity of incident radiation within a selected first wavelength band against a background of incident radiation within a second wavelength band, the radiation meter comprising a body which is substantially transparent to said incident radiation within the second wavelength band and which includes fluorescent material having an absorption spectrum such that the material is effective to select said first wavelength band by absorbing said incident radiation within the first wavelength band and consequently emits radiation within a third wavelength band different from the first wavelength band, the body being effective to direct the emitted radiation on to detector means which is screened from the incident radiation and which detects the emitted radiation and produces an output representative of the intensity of the radiation detected.

The incident radiation within a second wavelength band may be broadband radiation. Even so, in a radiation meter in accordance with the invention the detector means may be a broadband detector.

Preferably the surface of the body on which said incident radiation is incident is larger than the surface of said body to which said emitted radiation is directed.

BRIEF DESCRIPTION OF THE DRAWINGS

Radiation meters in accordance with the invention will now be described, by way of example only, with reference to the accompanying drawings, in which.

DETAILED DESCRIPTION OF THE PREFERRED EMBODIMENTS

Figure 1:
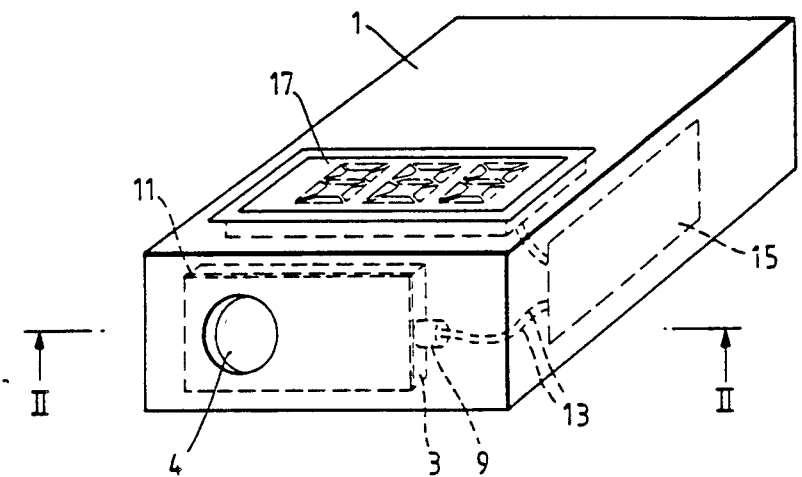
FIG. 1 is a pictorial view of the meter.
Figure 2:
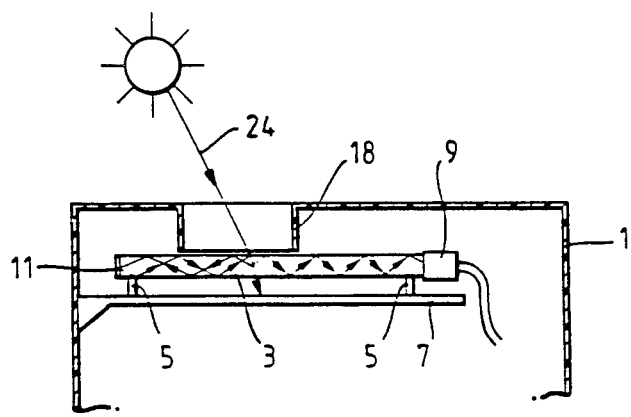
FIG. 2 is a fragmentary section along a line II—II of FIG. 1 on a larger scale than FIG. 1.

Referring firstly to FIGS. 1 and 2, the meter, which is designed to measure the intensity of incident UV radiation within the wavelength band 280-320 nm (UVB) against a background of sunlight, comprises a plastics housing 1, in which is mounted a 3 mm thick rectangular sheet 3 of poly(methylmethacrylate), part of the upper surface of which is visible through a window 4 in the end of the housing 1, which window is substantially smaller than the sheet 3. Throughout the sheet 3 there is dispersed an amount of approximately 1 to 3% w/w of, for example, one of the fluorescent dyes shown in Table I below, the absorption spectra of which closely match the erythemal response curve of human skin and the emission peaks of which lie between 325 and 450 nm.

TABLE 1

| Dye | Absorption Edge |
|---|---|
| 9,10 Dihydrophenanthrene | 302–312 nm |
| 1 Phenylnaphthalene | 302–325 nm |
| 2 Phenylnaphthalene | 300–330 nm |
| 3,7 - Dihydro-s-indacene | 290–325 nm |
| 1,1 - Diphenylbuta-1,3-diene | 300–320 nm |

The sheet 3 is carried within the housing 1 by spacers 5 which separate the sheet 3 from a matt absorbing layer 7 on a support mounted off the side of the housing 1. A photodiode 9, which is preferably a gallium phosphide device, but may alternatively be a silicon device, is also provided within the housing 1 with its receptive face in contact with part of the edge of the sheet 3, the rest of the edge being preferably coated with a layer of white paint 11. The output of the photodiode is connected via leads 13 to electronic circuitry 15 including a display 17, such as a liquid crystal display, which is visible through a further window in the housing 1. An inwardly-pointing wall 18 around the window 4 prevents radiation received through the window from impinging directly on the photodiode 9.

Figure 3:
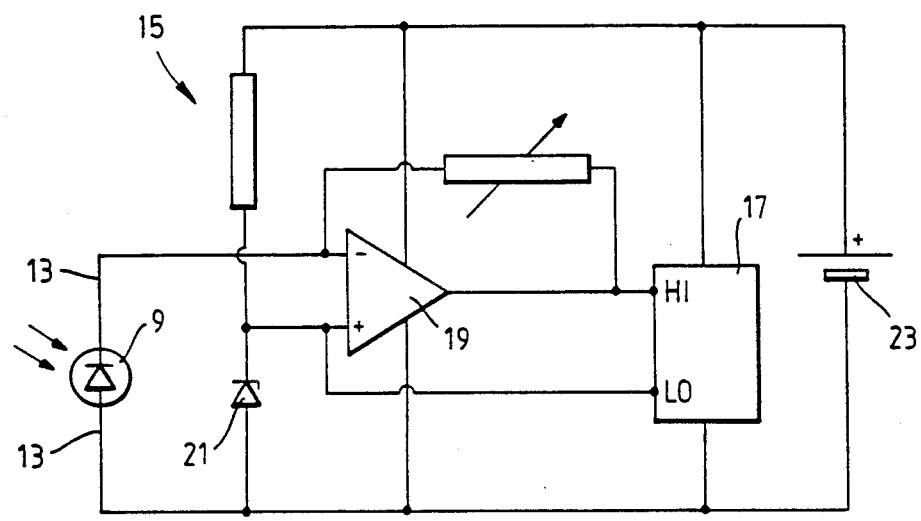
FIG. 3 is a block schematic diagram of electronic circuitry incorporated in the meter.

Referring also to FIG. 3, the electronic circuitry 15 is of standard low-cost form including an operational amplifier 19 connected by a network of resistors and a Zener diode 21 to the display 17, the circuitry being driven by a small battery 23.

In use of the meter, most of the sunlight 24 incident on the upper surface of the sheet 3 will pass straight through the sheet to be absorbed by the matt absorbing layer 7, the air gap between the sheet 3 and the layer 7 minimizing the amount of sunlight which will be reflected at the lower surface of the sheet 3. Incident UV radiation will, however, be absorbed by the fluorescent dye within the sheet 3, which will then emit fluorescent radiation of a longer wavelength. In the absence of defects, for example scratches on the surfaces of the sheet 3, a large fraction of this radiation will be totally internally reflected by the parallel-sided plastic sheet 3, radiation incident on the reflective layer 11 also being reflected back into the sheet 3. Thus, a concentration of the fluorescent radiation will occur at the receptive surface of the photodetector 9, giving the meter a high signal to noise ratio. An indication of the output of the detector 9 is given by the display 17.

It will be appreciated that in the form described above the meter may be cheaply fabricated in a relatively compact form, and will thus find ready application by the general public for measuring the intensity of UVB radiation, i.e. the radiation responsible for sunburn and skin cancer, so as to give an indication of the amount of time a person may be safely exposed to the prevailing sunlight. A suitable form of material for the sheet 3 for this application is available from Nuclear Enterprises under the trade name Pilot U. This material already contains an absorbing dye having an absorption band between 240 and 350 nm, and an emission band centered at 390 nm. Such a meter may include a device for assisting the user in directing the receptive surface of the sheet 3 towards the incident sunlight. Such a device may take the form of a small peg projecting from the housing 1, effective to cast a shadow on one or more fiducial marks.

A radiation meter in accordance with the invention may be designed for the measurement of the intensity of incident radiation within any wavelength band. In particular a meter in accordance with the invention may find particular application by x-ray workers as a cheap, compact personal monitoring system for monitoring the x-radiation level. Such a meter may be made very compact to act as an instantly readable alternative to the film badges presently used by x-ray workers. An indication that a greater than acceptable intensity of x-radiation is incident on the meter may be given, for example, by an aural signal produced by a bleeper incorporated in the meter.

It will be appreciated that the choice of fluorescent material will depend on the wavelength band of the incident radiation which it is required to detect, and also on the detector means used to detect the fluorescent radiation, visible light photodetectors such as silicon photodiodes being particularly applicable as they are very cheap. A fluorescent dye dispersed through a sheet of material which is transparent to the incident radiation which it is not required to measure is a particularly convenient medium.

In an alternative form of the device, a primary fluorescent material may be used to absorb the incident radiation within the chosen wavelength band, this producing fluorescent radiation which is itself absorbed by a secondary fluorescent material, which in turn fluoresces to produce the radiation detected by the detector means. If the primary fluorescent material selectively absorbs radiation within a narrow selected wavelength band, whilst the secondary fluorescent material absorbs both the fluorescent radiation emitted by the primary fluorescent material and the wideband incident radiation, then the meter may be used to give an indication of the intensity of the total incident radiation and, by insertion of a single optical filter in front of the photodiode, the meter will indicate the intensity of the radiation within the selected wavelength band.

Figure 4:
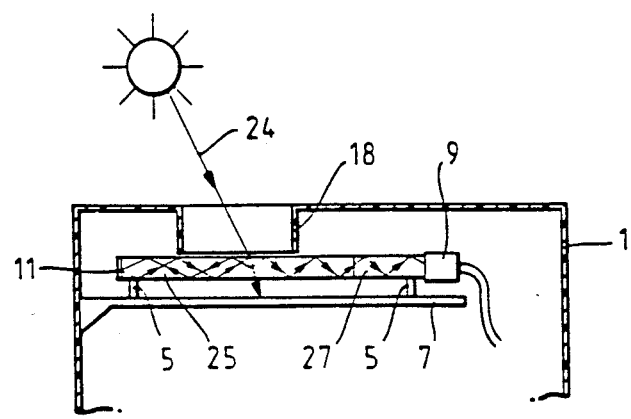
FIG. 4 is a schematic view of an alternative form of part of the meter of FIG. 2.

In another alternative form, as shown in FIG. 4, the sheet 3 is replaced by two sheets 25 and 27 which are bonded end-to-end in such a manner that a good optically-transparent joint is produced therebetween. The sheet 25 contains a primary fluorescent dye which reponds to the selected (e.g. UVB) radiation wavelength to produce a primary fluorescence of a given wavelength. This primary fluorescent radiation enters the sheet 27. This sheet contains a secondary fluorescent material which is responsive to the primary fluorescence and which emits a secondary fluorescence of longer wavelength, which then impinges upon the photodiode 9. This arrangement enables the use of a photodiode which needs only to respond to longer wavelengths and so facilitates the provision of a suitable photodiode or other photo-sensitive device.

In order to achieve accurate selection of the desired wavelength band for detection in any of the embodiments described above, a quantity of an absorptive dye may be dissolved into the sheet, before or after incorporation of the fluorescent dye therein, to modify the wavelength response of the sheet. For example, the response of a sheet containing a fluorescent dye which responds in a wavelength band which is slightly different from the 280–320 mm band in which the tanning or sunburning response of the human skin lies can be matched more accurately to that response by the incorporation of a suitable absorptive dye in the sheet.

We claim:

1. A radiation meter for measuring the intensity of incident radiation within a selected first wavelength band in the presence of incident radiation within a second wavelength band or bands, the radiation meter comprising: a body which is substantially transparent to said incident radiation within the second wavelength band or bands and which includes fluorescent material having an absorption spectrum such that the material is effective to select only said first wavelength band by absorbing said incident radiation within the first wavelength band and consequently emitting radiation within a third wavelength band different from the first wavelength band, the body being effective to direct the emitted radiation onto detector means which is screened from the incident radiation and which is operative for detecting the emitted radiation and for producing an output representative of the intensity of the radiation detected.

2. A meter according to claim 1, in which said second wavelength band is broadband and the detector means is responsive to broadband radiation.

3. A meter according to claim 1, in which the surface of the body on which the radiation is incident is larger than the surface of the body to which the emitted radiation is directed.

4. A meter according to claim 1 including display means responsive to said output to give a visible indication of said intensity of radiation detected.

5. A meter according to claim 1, in which the body is of planar construction such that said radiation within the third wavelength band is totally internally reflected between two major surfaces of said body, the detector means being positioned so as to be responsive to radiation emitted from a peripheral surface of said body.

6. A meter according to claim 5, in which the body comprises a sheet of material through which is dispersed at least one fluorescent dye.

7. A meter according to claim 6, in which said sheet of material is formed from poly(methylmethacrylate).

8. A meter according to claim 6, in which the dye is selected from the following dyes: 9,10 Dihydrophenanthrene, 1 Phenylnaphthalene, 2 Phenylnaphthalene, 3,7 Dihydro-s-indacene and 1,1 Diphenylbuta-1,3-diene.

9. A meter according to claim 6, including a plurality of said fluorescent materials, each excitable by incident radiation within a different wavelength band.

10. A meter according to claim 9, in which a primary fluorescent material is excitable by said incident radiation within said first wavelength band, and a secondary fluorescent material is excitable by the fluorescent radiation emitted by said primary material to produce said radiation within the third wavelength band.

11. A meter according to claim 10, in which the body comprises first and second optically-coupled members which contain the primary and secondary fluorescent materials, respectively; and in which the second member is screened from the incident radiation in said first and second wavelength bands.

12. A meter according to claim 1, in which the body includes an absorptive dye to modify the wavelength response of the body to obtain greater accuracy in the selection of said first wavelength band.

13. A meter according to claim 1, in which said first wavelength band is the UVB wavelength band.

14. A meter according to claim 1, in which the radiation in said second wavelength band is visible light.

* * * * *

UNITED STATES PATENT AND TRADEMARK OFFICE
CERTIFICATE OF CORRECTION

PATENT NO. : 4,935,631
DATED : June 19, 1990
INVENTOR(S) : Alan Mosley, et al.

It is certified that error appears in the above-identified patent and that said Letters Patent is hereby corrected as shown below:

On the cover page - under the heading "Inventors:", after "Belfast," insert the following:

--Northern Ireland; Michael G. Clark, Gerrards Cross,

England; and Martin R. Lewis, London, England--.

Signed and Sealed this

Second Day of March, 1993

*Attest:*

STEPHEN G. KUNIN

*Attesting Officer*  *Acting Commissioner of Patents and Trademarks*